Feb. 8, 1966   E. H. GALE   3,233,499
FASTENER WITH FLUID RETENTION MEANS
Filed Sept. 14, 1962
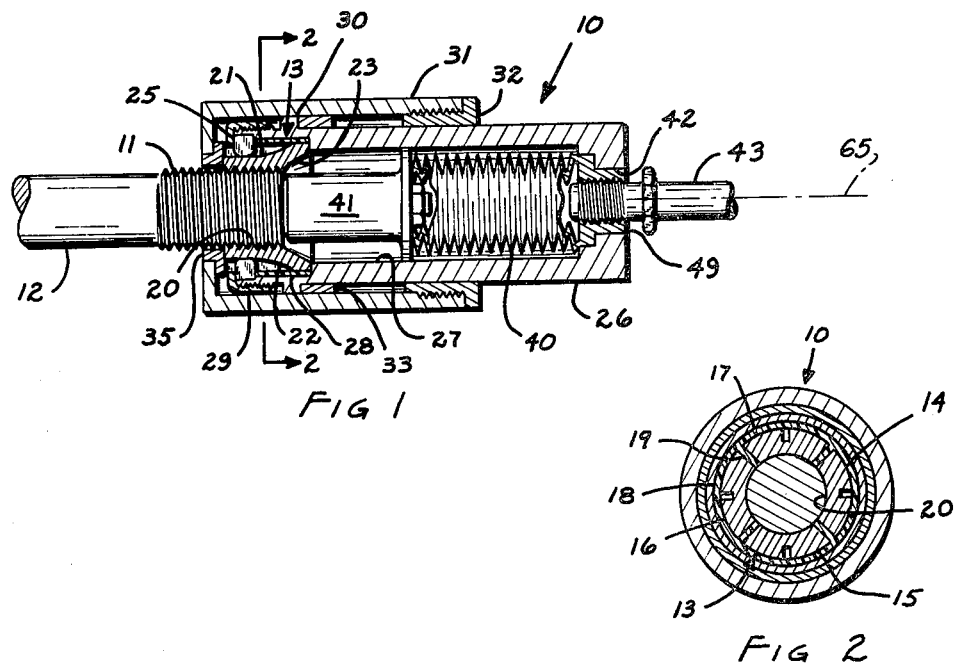
FIG 1
FIG 2
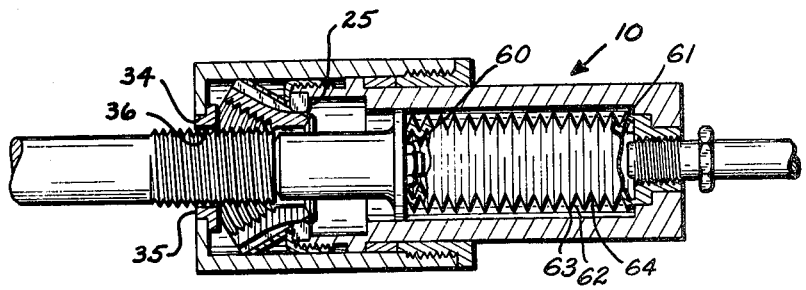
FIG 3
INVENTOR.
EDWARD H. GALE
BY
ATTORNEYS

United States Patent Office 3,233,499
Patented Feb. 8, 1966

3,233,499
FASTENER WITH FLUID RETENTION MEANS
Edward H. Gale, Torrance, Calif., assignor to Hi-Shear Corporation, Torrance, Calif., a corporation of California
Filed Sept. 14, 1962, Ser. No. 223,729
2 Claims. (Cl. 85—33)

This invention relates to a separable nut of the type wherein separation of the nut from a threaded object to which it is attached is accomplished by fluid forces.

In fluid-actuated separable nuts, it is common practice to utilize gas cartridges, most frequently of the explosive type, to generate gas forces and thus to cause relative axial motion between two portions of the nut for disengaging it from a body to which it is attached. Heretofore, it has been conventional to permit the products of combustion, or such other gases or fluids as are utilized, to escape into surrounding regions. However, new requirements have arisen for this type of device in which the surrounding environment might itself be explosive, or in which contamination by the actuating fluids would for some reason be undesirable.

It is therefore an object of this invention to provide a fluid-actuated separable nut in which the fluid is retained by the nut assembly itself so that the device is safe to use in explosive atmospheres, as well as in environments where contamination is undesirable.

A separable nut assembly according to this invention comprises a plurality of nut segments which are adapted to be assembled together to form a nut member having an axially, internally threaded passage. A release member has a recess which opens at one end to receive the nut member. Retainer means normally holds the nut member in this recess. Within the recess in the release member there is placed a bellows of the class having circumferential folds that adapt the bellows to extend axially when a positive differential pressure is applied inside it. A source of pressurized fluid is adapted to discharge into the bellows to cause this axial extension. One end of the bellows contacts the release member, and the other contacts structure connected to the nut member. The opposing force exerted by the bellows when pressurized tends to separate the retainer means and the nut member from the release member, thereby freeing the nut segments from the structure.

The invention will be fully understood from the following detailed description and the accompanying drawings in which:

FIG. 1 is a side view, partly in cutaway cross-section, showing the presently preferred embodiment of the invention;

FIG. 2 is a cross-section taken at line 2—2 of FIG. 1; and

FIG. 3 shows the embodiment of FIG. 1 in its actuated, disengaged condition.

In FIG. 1, there is shown a fluid-actuated, separable nut assembly 10, which is adapted to be attached to structure such as threads 11 on a bolt 12 or stud. The objective, of course, is to make a threaded joint which can be released so as to permit the separation of bodies held together by the structure when the assembly is separated.

The assembly includes a nut member 13 which is formed of four nut segments 14, 15, 16, 17. These nut segments are held together by a band 18, which has fins 19 projecting between the nut segments so as to space these segments apart and hold them aligned so that internal thread segments 20 on the inside of each of the nut segments form aligned portions of an interrupted thread. The nut segments together form less than the entire periphery, but as grouped by the band, form a peripheral enclosure with the four gaps, one between each pair of adjacent segments.

As can best be seen in FIG. 1, a groove 21 is formed in each of the nut segments, each of the grooves having a ramp section 22 at its end away from the bolt. A relief 23 at the inner end beneath the ramp enables the nut segments to pivot away from the bolt, as will hereinafter be described. The assembled nut segments are substantially identical to those shown in pending William R. Dickie United States patent application, Serial No. 150,306, filed November 6, 1961, entitled "Separable Nut," which is assigned to the same assignee as the instant application. A key 25 rides in each of the grooves for camming purposes to be described.

A release member 26 includes a cavity 27 having an open end 28 which receives the nut segments and surrounds the same. A collar 29 (sometimes called an "overhang") is threaded to the open end of the release member and overhangs the keys so as to pull the keys to the right in FIG. 1 when the device is operated. The collar also overhangs the end of band 18 to hold the release member and the nut member against relative axial reciprocation until actuation occurs.

The release member includes an outer flange 30 which makes a close fit with an inside surface of a retainer means 31, the retainer means having a plug 32 threaded into one end thereof. The flange makes a sliding seal with the interior surface of the retainer means. A sealing gland 33 is disposed between the retainer means and release member.

A shoulder 34 supports an insert 35 in the left-hand end of the retainer means as shown in FIGS 1 and 3, which insert includes a port 36. The threaded stud or bolt is passed through this port. The port is of such a size relative to the nut segments that they cannot fall out through the port even when the devices are separated.

Cavity 27 contains a bellows 40 which carries at one end a stud shaft 41 which is adapted to contact a structure within the nut segments, namely the threaded object to which the nut is attached (bolt 12 in the example), and an internally threaded member 49 at the other end. An opening 42 in the end of the retainer member opposite the nut segments receives the internally threaded member 49. Member 49 is adapted to receive threaded cartridge 43, which cartridge is adapted to discharge fluid under pressure into the bellows to move shaft 41 to the left in FIG. 1 and, by bearing against the right-hand end of the release member, to move it in opposition thereto.

The stub shaft is attached to an end barrier 60 of the bellows, and another end barrier 61 is connected to release member. The bellows includes a continuous, fluid impervious wall which joins the end barriers. This wall includes at least one, but preferably a plurality of, circumferential folds 62. Each fold has a crest 63 and an adjacent root 64. The diameter of the crest is greater than that of the root when the fold is closed, and the difference in diameters lessens when the fold is opened upon axial movement apart of the end members, as when fluid under pressure is exerted inside the bellows.

Relative movement of the major parts, and expansion of the bellows, is along axis 65, which axis is the central axis of the device and of the bellows.

The preferred embodiment of cartridge is a gas-forming solid charge adapted to be ignited to discharge gas under pressure into the bellows. The term "cartridge" also includes gas-containing cartridges such as $CO_2$ cartridges.

Other types of fluid pressure supplies may be used in place of cartridges. For example, the opening may be connected to a line from a conventional pressure source such as a compressor or accumulator.

The operation of the device is shown in FIGS. 1 and 3. Nut member 13 is initially tightened onto bolt 12, where it forms a tightened joint until pressurized fluid is introduced into the bellows. When the cartridge is fired to introduce fluid under pressure into the bellows, the stub shaft, and with it retainer means 31, are pressed to the left in FIG. 1. Simultaneously, release member 26 is forced toward the left in FIG. 1, and the retainer member to the right. This causes the collar to pull the keys to the right until they strike the ramp sections of the grooves. As the keys move, they cut the band into four pieces, so that the band does not hold the nut segments assembled any longer. The keys ultimately ride atop the ramp sections and cam the nut segments free from the threads on the bolt as shown in FIG. 3. Further movement of the stub shaft exerts an expulsive force on the bolt, tending to force the bolt out of the nut. It will be observed that all of the gases remain trapped in the bellows.

This invention provides an effective means for actuating a separable nut device while still retaining fluids utilized for the separation. It will be understood that the essence of this invention resides in the trapping of these gases, and that the structure shown, and the techniques used are useful with other embodiments of separable nut fasteners as well as with that which is shown.

This invention is not to be limited by the embodiments shown in the drawings and described in the description which are given by way of example and not of limitation, but only in accordance with the scope of the appended claims.

I claim:

1. A separable nut assembly having an axis and actuable by fluid forces wherein the actuating fluid is retained by the assembly, comprising: a plurality of nut segments, means holding the segments together to form a nut member having an axis and an axially-extending, internally-threaded passage; a release member having an axially-extending internal cavity, and an open end, said nut member being at least partially received in said cavity so that its axis is parallel to that of the assembly and held against disassembly by said release member and being axially movable toward the open end of said release member, said release member and said nut member having interengaging means; an axially-extensible bellows in said cavity, said bellows comprising two end barriers and a continuous wall joining said barriers, the barriers and wall forming a fluid-tight enclosure, said bellows having an axis parallel to the axis of the assembly and aligned with the axis of the nut member, the wall including at least one circumferential fold having a crest and an adjacent root, the diameter of the crest being greater than that of the root when the fold is closed, and the difference in diameters being less when the fold is opened by axial movement apart of the end barriers; and a source of fluid under pressure fluidly connected to the inside of the bellows for causing axial movement apart of said end barriers, one of said end barriers bearing against the retainer at its end opposite said open end, and the other end barrier being adapted to bear against externally threaded structure to which the nut member may be attached whereby pressurizing the bellows moves the end barriers axially apart and thereby causes relative axial movement of the nut member and release member whereby said interengaging means causes release of said nut segments from the externally-threaded structure.

2. A separable nut assembly according to claim 1 in which a retainer means is telescopically mounted to said release member, said retainer means including an axial port for passing said structure, said port being so proportioned as to prevent the passage of a nut segment therethrough, and including engagement means adapted to engage the release member to prevent the separation of the retainer means from the release member, whereby fluid is retained in the bellows and the nut segments within the retainer means and release member, the assembly thereby completely retaining its own elements and the actuating fluid after separation.

References Cited by the Examiner

UNITED STATES PATENTS

| 3,053,131 | 9/1962 | Stott | 85—33 |
| 3,071,404 | 1/1963 | Van Hove. | |
| 3,119,302 | 1/1964 | Barr | 85—1 |
| 3,120,149 | 2/1964 | Dickie | 85—33 |
| 3,147,663 | 9/1964 | Brown | 85—33 |

FOREIGN PATENTS 558,302 12/1943 Great Britain.

EDWARD C. ALLEN, *Primary Examiner.*